United States Patent
Chang

(10) Patent No.: US 9,164,364 B2
(45) Date of Patent: Oct. 20, 2015

(54) PROJECTOR MOUNT

(71) Applicant: DELTA ELECTRONICS, INC., Taoyuan Hsien (TW)

(72) Inventor: Chen-Hsien Chang, Taoyuan Hsien (TW)

(73) Assignee: DELTA ELECTRONICS, INC, Taoyuan (TW)

( * ) Notice: Subject to any disclaimer, the term of this patent is extended or adjusted under 35 U.S.C. 154(b) by 225 days.

(21) Appl. No.: 13/744,855

(22) Filed: Jan. 18, 2013

(65) Prior Publication Data

US 2014/0077053 A1    Mar. 20, 2014

(30) Foreign Application Priority Data

Sep. 17, 2012    (TW) .............................. 101133915 A

(51) Int. Cl.
| | |
|---|---|
| *F16M 11/12* | (2006.01) |
| *G03B 21/14* | (2006.01) |
| *F16M 11/04* | (2006.01) |
| *F16M 11/20* | (2006.01) |
| *G03B 21/54* | (2006.01) |
| *F16M 11/24* | (2006.01) |
| *F16M 13/02* | (2006.01) |

(52) U.S. Cl.
CPC ............ *G03B 21/145* (2013.01); *F16M 11/04* (2013.01); *F16M 11/12* (2013.01); *F16M 11/2085* (2013.01); *F16M 11/2092* (2013.01); *F16M 11/24* (2013.01); *F16M 13/02* (2013.01); *G03B 21/54* (2013.01)

(58) Field of Classification Search
CPC ....... F16M 11/04; F16M 11/24; F16M 11/10; F16M 11/2092; F16M 11/2014
USPC ................. 248/324, 317, 323, 343, 342, 344, 248/282.1, 278.1, 284.1, 288.11, 222.11, 248/674, 274.1, 279.1, 285.1, 276.1, 272.1, 248/287.1, 286.1, 289.11, 291.1, 292.14, 248/327, 333; 353/119, 63; 312/10.1; 348/373
See application file for complete search history.

(56) References Cited

U.S. PATENT DOCUMENTS

| | | | | |
|---|---|---|---|---|
| 5,551,658 | A * | 9/1996 | Dittmer .......................... | 248/329 |
| 6,059,413 | A * | 5/2000 | Okubo ............................ | 353/77 |
| 6,485,144 | B1 * | 11/2002 | Liao ............................... | 352/243 |
| 7,156,359 | B2 * | 1/2007 | Dittmer et al. ................. | 248/551 |
| 7,503,536 | B2 * | 3/2009 | Friederich et al. ............. | 248/324 |
| 7,758,001 | B2 * | 7/2010 | Bouissiere ..................... | 248/206.5 |
| 7,891,624 | B2 * | 2/2011 | Dittmer et al. ................. | 248/323 |
| 7,922,139 | B2 * | 4/2011 | Dittmer et al. ................. | 248/325 |
| 7,942,375 | B2 * | 5/2011 | Dozier et al. .................. | 248/324 |
| 8,033,519 | B2 * | 10/2011 | David ............................. | 248/324 |
| 8,276,867 | B2 * | 10/2012 | Hung ............................. | 248/323 |
| 8,297,578 | B2 * | 10/2012 | Dittmer et al. ................. | 248/323 |
| 8,454,174 | B2 * | 6/2013 | Nakano et al. ................. | 353/119 |

(Continued)

*Primary Examiner* — Nkeisha Smith
(74) *Attorney, Agent, or Firm* — Muncy, Geissler, Olds & Lowe, P.C.

(57) ABSTRACT

A projector mount is provided, which includes a foundation, a base, a Y axis translation unit, a rod, an X axis translation unit, a telescopic element, a Z axis translation unit and an angle adjusting unit. The base is connected to the foundation. The base is moved in the Y axis relative to the foundation via the Y axis translation unit. The rod is connected to the base. The rod is moved in the X axis relative to the base via the X axis translation unit. The telescopic element is connected to the rod. The telescopic element is moved in the Z axis relative to the rod via the Z axis translation unit. The angle adjusting unit is connected to the telescopic element.

16 Claims, 11 Drawing Sheets

(56) References Cited

U.S. PATENT DOCUMENTS

| | | | |
|---|---|---|---|
| 8,511,629 B2* | 8/2013 | Sullivan | 248/286.1 |
| 8,573,551 B2* | 11/2013 | Hung | 248/286.1 |
| 2002/0084396 A1* | 7/2002 | Weaver | 248/278.1 |
| 2004/0080665 A1* | 4/2004 | Lovell | 348/373 |
| 2005/0178937 A1* | 8/2005 | Liang | 248/278.1 |
| 2005/0236546 A1* | 10/2005 | O'Neill | 248/317 |
| 2006/0109433 A1* | 5/2006 | Chen | 353/119 |
| 2007/0034764 A1* | 2/2007 | Dittmer et al. | 248/324 |
| 2007/0034765 A1* | 2/2007 | Lo | 248/343 |
| 2008/0011927 A1* | 1/2008 | Park | 248/324 |
| 2008/0061200 A1* | 3/2008 | Bouissiere | 248/206.5 |
| 2008/0308700 A1* | 12/2008 | Wei et al. | 248/326 |
| 2009/0108150 A1* | 4/2009 | Dozier et al. | 248/205.1 |
| 2009/0294619 A1* | 12/2009 | David | 248/324 |
| 2010/0242404 A1* | 9/2010 | Bouissiere | 52/745.21 |
| 2010/0314513 A1* | 12/2010 | Evans et al. | 248/217.4 |
| 2011/0089300 A1* | 4/2011 | Walters et al. | 248/274.1 |
| 2011/0174937 A1* | 7/2011 | Sullivan | 248/122.1 |

* cited by examiner

PROJECTOR MOUNT

CROSS REFERENCE TO RELATED APPLICATIONS

This Application claims priority of Taiwan Patent Application No. 101133915, filed on Sep. 17, 2012, the entirety of which is incorporated by reference herein.

BACKGROUND OF THE INVENTION

1. Field of the Invention

The present invention relates to a mount, and in particular to a projector mount.

2. Description of the Related Art

Conventional projector mounts only provide five degrees of freedom, which cannot position the projector properly. The relative angle and position between two parts of the conventional projector mount are changed manually first, and then screwing the two parts together tightly. However, the conventional modification process cannot provide fine-tuned functionality. Additionally, when the two parts are being fixed by screws, the projector may sway and/or swerve, and the shape and dimension of the projection image may be changed.

BRIEF SUMMARY OF THE INVENTION

In one embodiment of the invention, a projector mount is provided. The projector mount includes a foundation, a base, a Y axis translation unit, a rod, an X axis translation unit, a telescopic element, a Z axis translation unit and an angle adjusting unit. The base is connected to the foundation. The Y axis translation unit is connected to the foundation and the base, wherein the base is moved in the Y axis relative to the foundation via the Y axis translation unit. The rod is connected to the base. The X axis translation unit is connected to the rod and the base, wherein the rod is moved in the X axis relative to the base via the X axis translation unit. The telescopic element is connected to the rod. The Z axis translation unit is connected to the rod and the telescopic element, wherein the telescopic element is moved in the Z axis relative to the rod via the Z axis translation unit. The angle adjusting unit is connected to the telescopic element.

In another embodiment of the invention, an angle adjusting unit includes a stage, a first member, a Y axis pivoting unit, a second member, an X axis pivoting unit, a third member, and a Z axis pivoting unit. The first member is connected to the stage. The Y axis pivoting unit is connected to the stage and the first member, wherein the first member pivots around the Y axis relative to the stage via the Y axis pivoting unit. The second member is connected to the first member. The X axis pivoting unit is connected to the first member and the second member, wherein the second member is pivoted around an X axis relative to the first member via the X axis pivoting unit. The third member is pivoted relative to the first member. The third member pivots around the Z axis relative to the first member via the Z axis pivoting unit.

Utilizing the projector mount of the embodiment of the invention, the position of the projector can be fine-tuned under six degrees of freedom (three translational degrees of freedom and three rotational degrees of freedom). The position of the projector can be conveniently modified. Additionally, as to the translational movement, the foundation, the base and the telescopic element are connected by screws attached on side portions thereof, and the translation fine-tune screws are utilized to fine-tune the translation, and the structure of the projector mount is therefore stable in the translation fine-tune process. As to the rotational movement, the pivoting fine-tune screws are utilized to fine-tune the rotation, and the pivoting fixing screws are utilized to fasten the position of the first member, the second member and the third member, and the structure of the projector mount is therefore stable in the rotational fine-tune process.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1A:
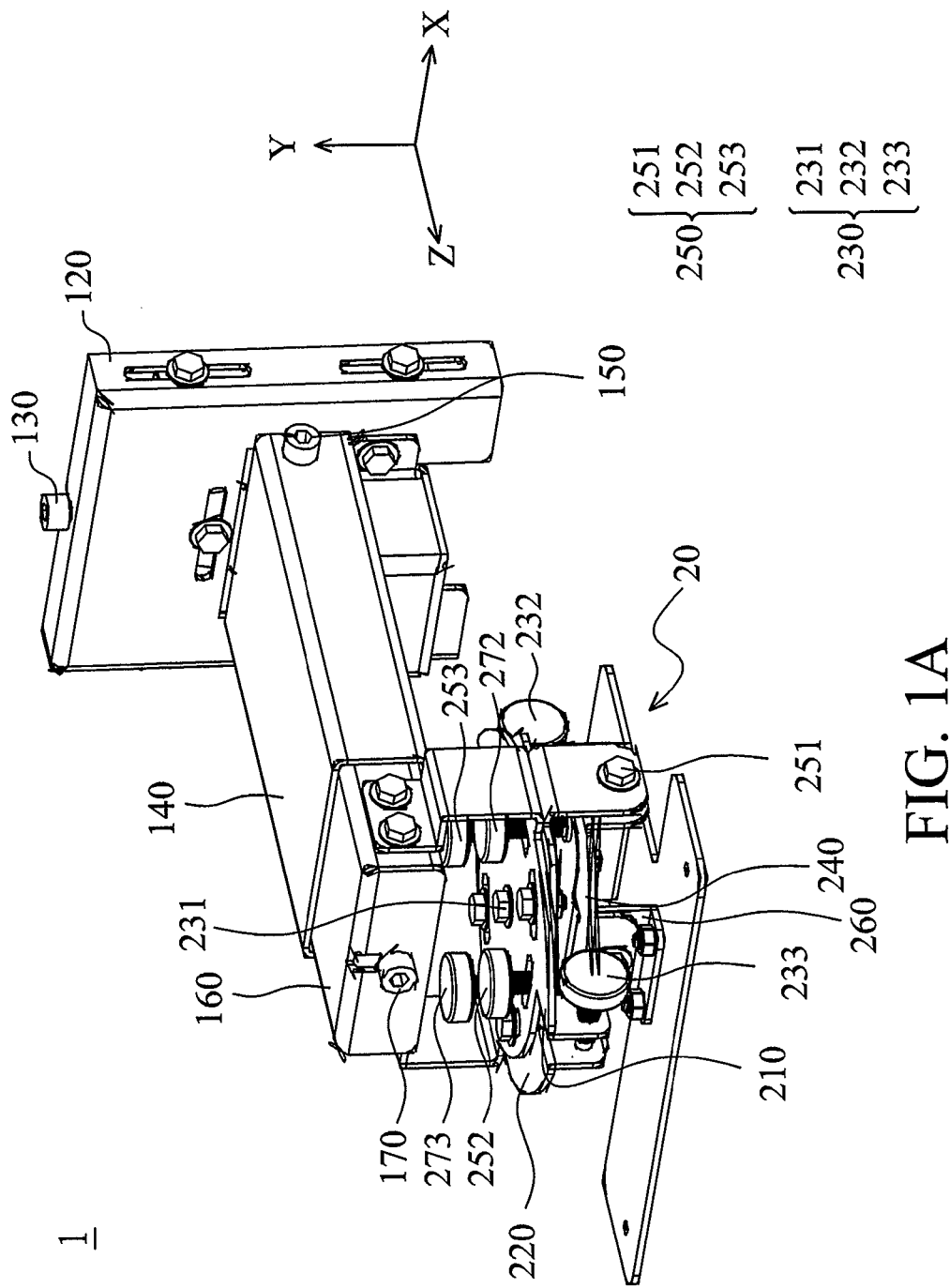
FIG. 1A is a perspective view of the projector mount of an embodiment of the invention.
Figure 1B:
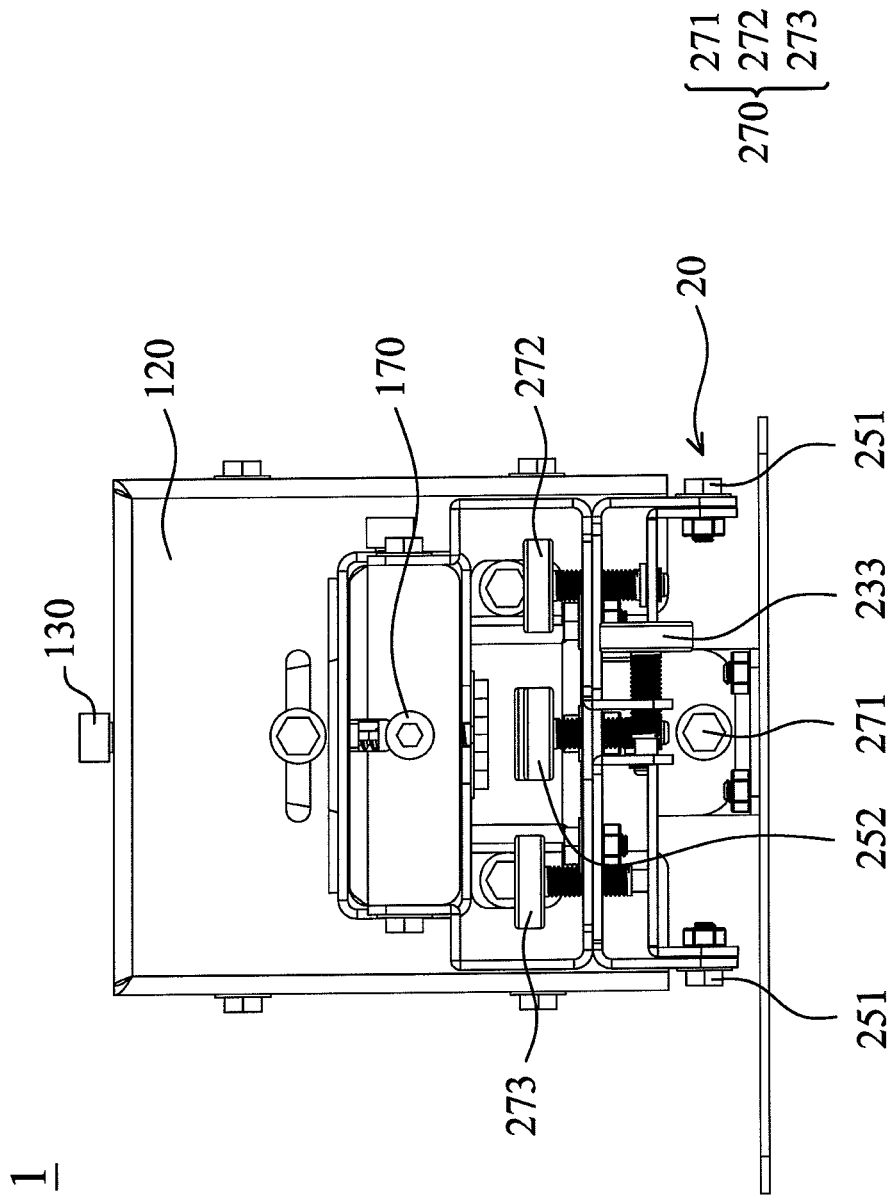
FIG. 1B is a front view of the projector mount of the embodiment of the invention.
Figure 1C:
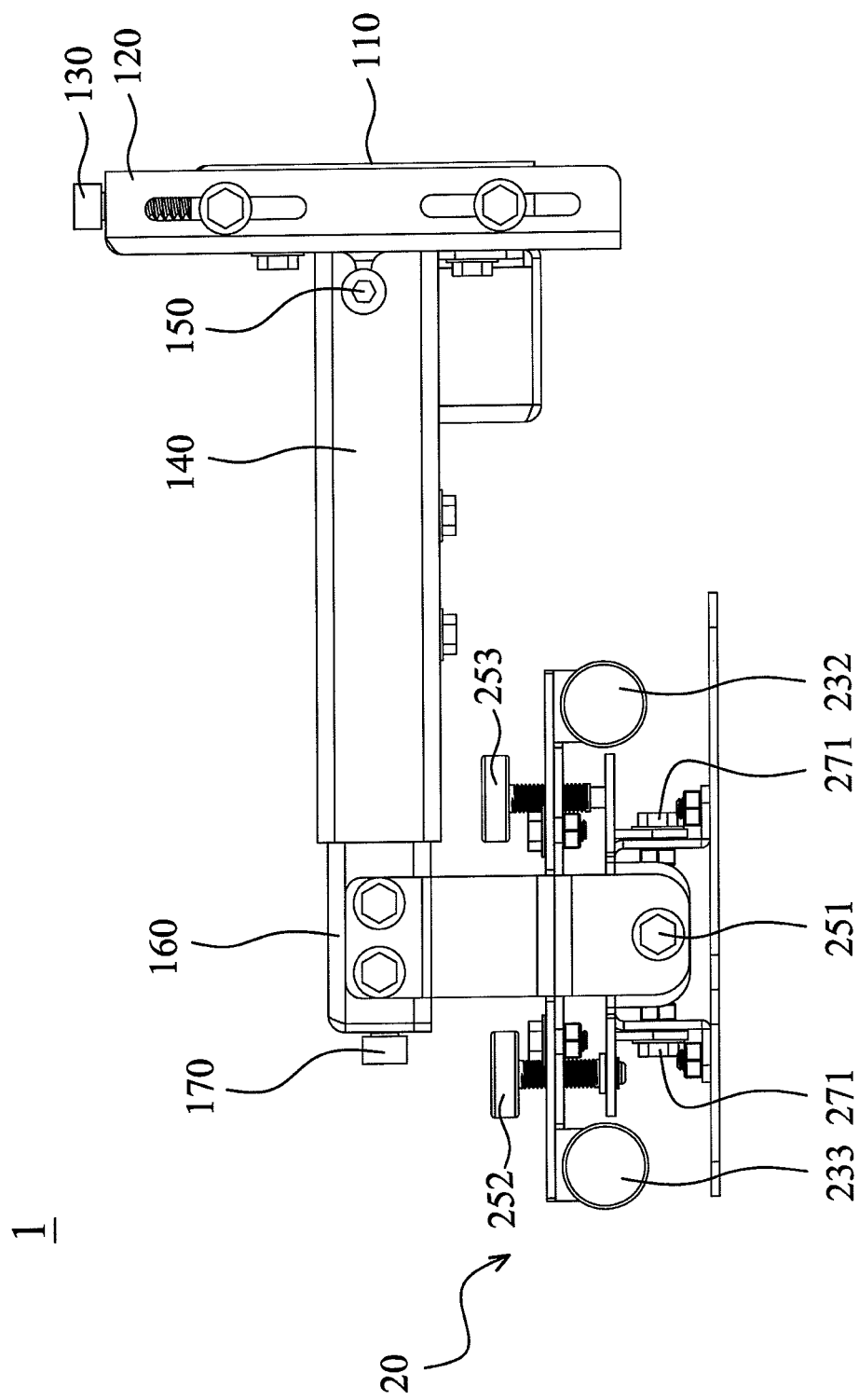
FIG. 1C is a side view of the projector mount of the embodiment of the invention.

FIGS. 1A, 1B and 1C show a projector mount 1 of an embodiment of the invention, including a foundation 110, a base 120, a Y axis translation unit 130, a rod 140, an X axis translation unit 150, a telescopic element 160, a Z axis translation unit 170, and an angle adjusting unit 20.

Figure 2A:
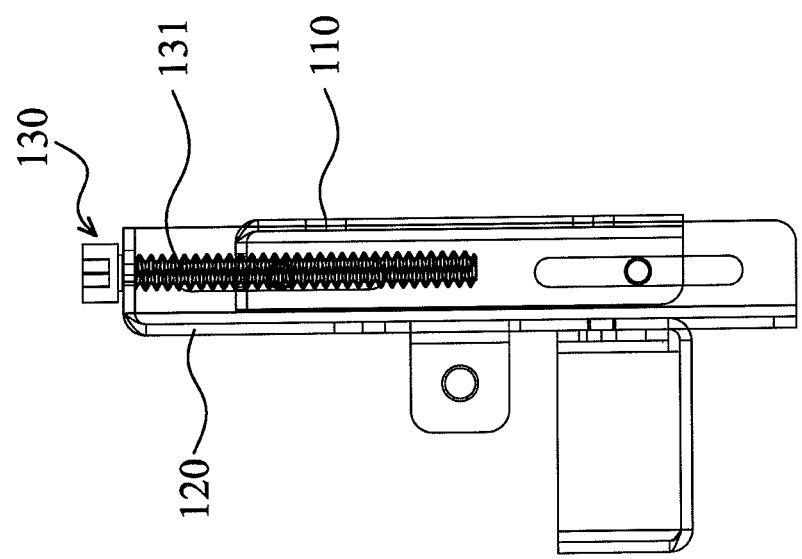
FIG. 2A shows detailed structure of the Y axis translation unit of the embodiment of the invention.
Figure 2B:
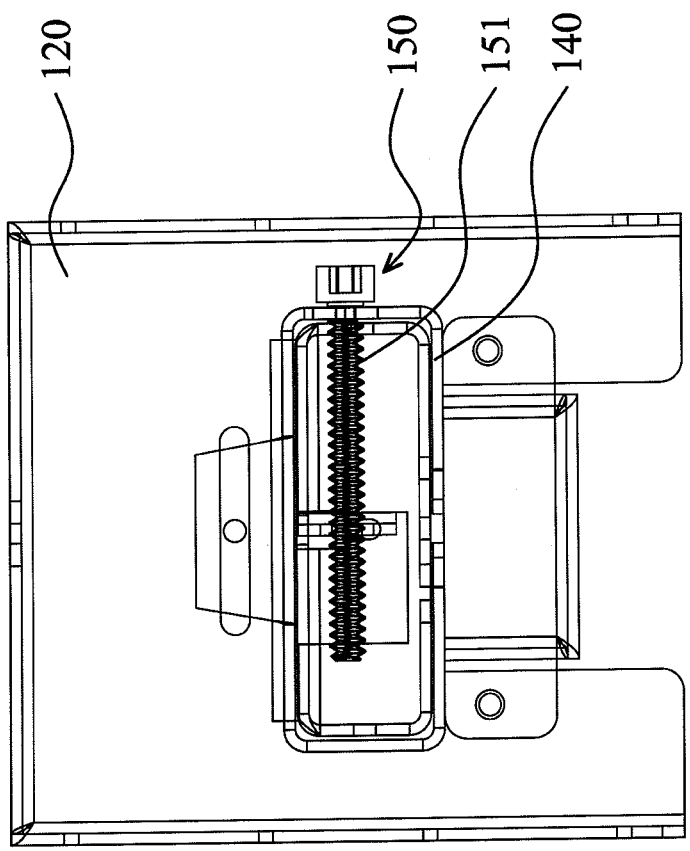
FIG. 2B shows detailed structure of the X axis translation unit of the embodiment of the invention.
Figure 2C:
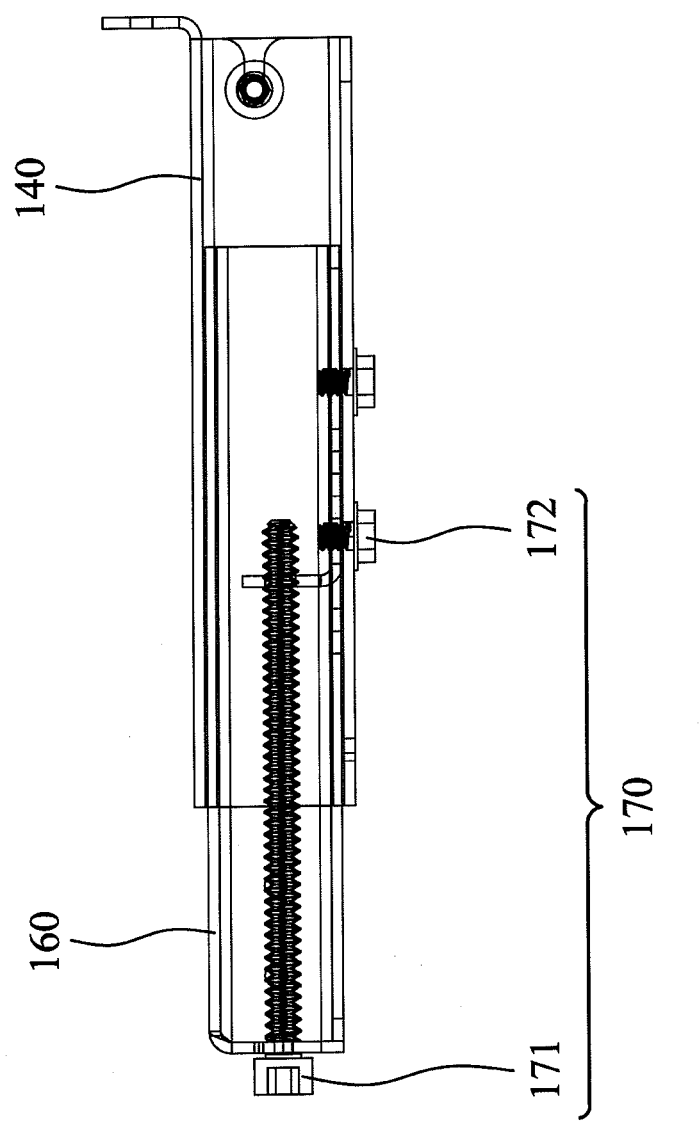
FIG. 2C shows detailed structure of the Z axis translation unit of the embodiment of the invention.

With reference to FIG. 2A, the Y axis translation unit 130 is connected to the foundation 110 and the base 120, wherein the base 120 is moved in the Y axis relative to the foundation 110 via the Y axis translation unit 130. With reference to FIG. 2B, the X axis translation unit 150 is connected to the rod 140 and the base 120, wherein the rod 140 is moved in the X axis relative to the base 120 via the X axis translation unit 150. With reference to FIG. 2C, the Z axis translation unit 170 is connected to the rod 140 and the telescopic element 160, wherein the telescopic element 160 is moved in the Z axis relative to the rod 140 via the Z axis translation unit 170. The angle adjusting unit 20 is connected to the telescopic element 160.

In this embodiment, the X axis, Y axis, and Z axis are perpendicular to each other.

With reference to FIG. 2A, the Y axis translation unit 130 comprises a Y axis translation fine-tune screw 131. The Y axis translation fine-tune screw 131 connects the base 120 to the foundation 110, and the base 120 is moved in the Y axis relative to the foundation 110 by rotating the Y axis translation fine-tune screw 131.

With reference to FIG. 2B, the X axis translation unit 150 comprises an X axis translation fine-tune screw 151. The X axis translation fine-tune screw 151 connects the base 120 to the rod 140, and the rod 140 is moved in the X axis relative to the base 120 by rotating the X axis translation fine-tune screw 151.

With reference to FIG. 2C, the Z axis translation unit 170 comprises a Z axis translation fine-tune screw 171. The Z axis translation fine-tune screw 171 connects the telescopic element 160 to the rod 140, and the telescopic element 160 is moved in the Z axis relative to the rod 160 by rotating the Z axis translation fine-tune screw 171.

With reference to FIG. 2C, the Z axis translation unit 170 further comprises at least one Z axis translation rough-tune screw 172. When the Z axis translation rough-tune screw 172 is detached, the telescopic element 160 can be manually moved in the Z axis relative to the rod 140 freely.

Figure 3A:
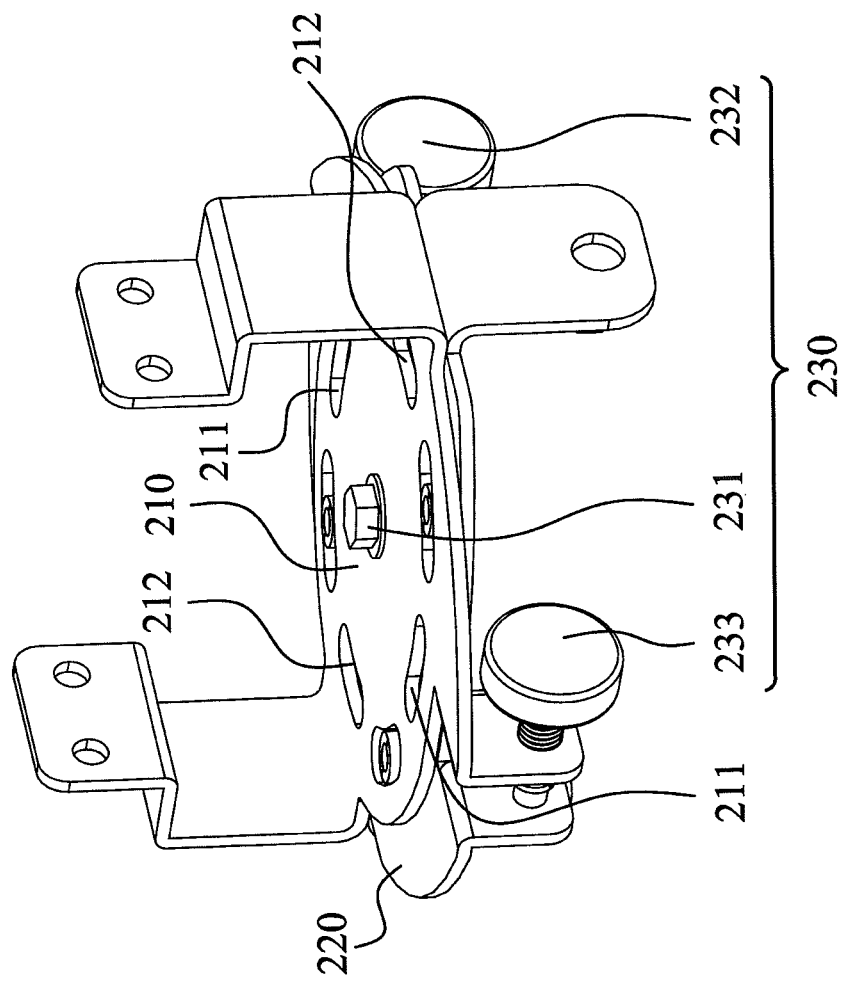
FIG. 3A shows detailed structure of the Y axis pivoting unit of the embodiment of the invention.
Figure 3B:
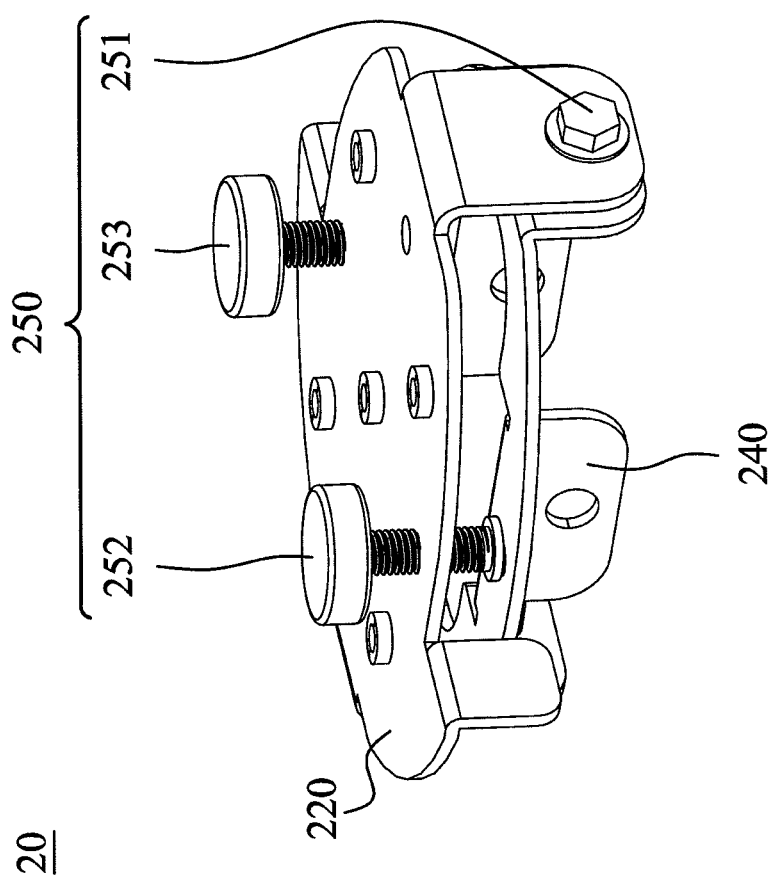
FIG. 3B shows detailed structure of the X axis pivoting unit of the embodiment of the invention.
Figure 3C:
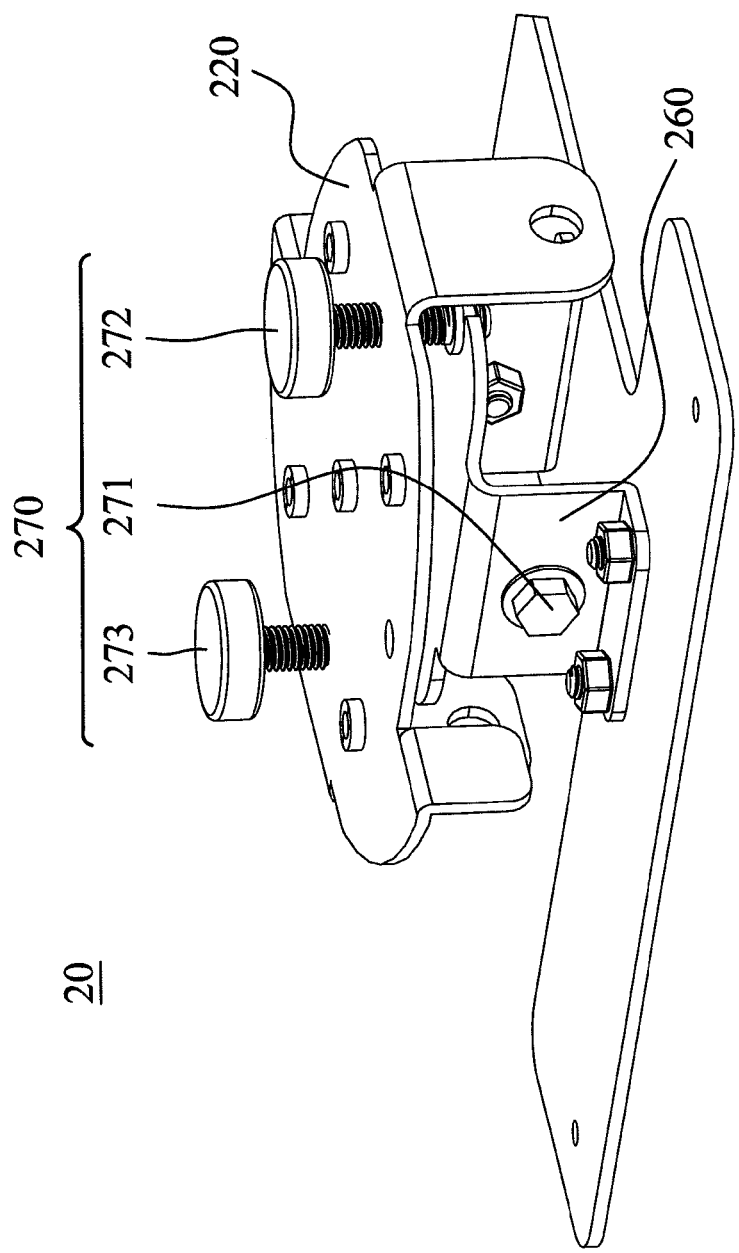
FIG. 3C shows detailed structure of the Z axis pivoting unit of the embodiment of the invention.

With reference to FIGS. 3A, 3B and 3C, the angle adjusting unit 20 comprises a stage 210, a first member 220, a Y axis pivoting unit 230, a second member 240, an X axis pivoting unit 250, a third member 260, and a Z axis pivoting unit 270.

The Y axis pivoting unit 230 is connected to the stage 210 and the first member 220, wherein the first member 220 pivots around the Y axis relative to the stage 210 via the Y axis pivoting unit 230. The X axis pivoting unit 250 is connected to the first member 220 and the second member 240, wherein the second member 240 pivots around the X axis relative to the first member 220 via the X axis pivoting unit 250. The third member 260 is pivoted relative to the first member 220. The third member 260 pivots around the Z axis relative to the first member 220 via the Z axis pivoting unit 270.

With reference to FIG. 3A, the Y axis pivoting unit 230 comprises a Y shaft 231, a Y axis pivoting fine-tune screw 232, and a Y axis pivoting fixing screw 233. The Y shaft 231 passes through the first member 220 and the stage 210, the Y axis pivoting fine-tune screw 232 passes through the first member 220 and is connected to the first member 220 and the stage 210, the first member 220 is pivoted around the Y shaft 231 relative to the stage 210 by rotating the Y axis pivoting fine-tune screw 232, and the Y axis pivoting fixing screw 233 abuts the first member 220 to position the first member 220.

With reference to FIG. 3B, the X axis pivoting unit 250 comprises at least one X shaft 251, an X axis pivoting fine-tune screw 252, and an X axis pivoting fixing screw 253. The X shaft 251 passes through the first member 220 and the second member 240, the X axis pivoting fine-tune screw 252 passes through the second member 240 and is connected to the first member 220 and the second member 240, the second member 240 is pivoted around the X shaft 251 relative to the first member 220 by rotating the X axis pivoting fine-tune screw 252, and the X axis pivoting fixing screw 253 abuts the second member 240 to position the second member 240.

With reference to FIG. 3A, X axis pivoting fine-tune slots 211 are formed on the stage 210, and the X axis pivoting fine-tune screw 252 and the X axis pivoting fixing screw 253 pass through the X axis pivoting fine-tune slots 211. In this embodiment, the X axis pivoting fine-tune slots 211 are curved.

With reference to FIG. 3C, the Z axis pivoting unit 270 comprises at least one Z shaft 271, a Z axis pivoting fine-tune screw 272, and a Z axis pivoting fixing screw 273. The Z shaft 271 passes through the second member 240 and the third member 260, the Z axis pivoting fine-tune screw 272 passes through the third member 260 and is connected to the first member 220 and the third member 260, the third member 260 is pivoted around the Z shaft relative to the first member 220 by rotating the Z axis pivoting fine-tune screw 272, and the Z axis pivoting fixing screw 273 abuts the third member 260 to position the third member 260.

With reference to FIG. 3A, Z axis pivoting fine-tune slots 212 are formed on the stage, and the Z axis pivoting fine-tune screw 272 and the Z axis pivoting fixing screw 273 pass through the Z axis pivoting fine-tune slots 212. The Z axis pivoting fine-tune slots are curved.

Figure 4A:
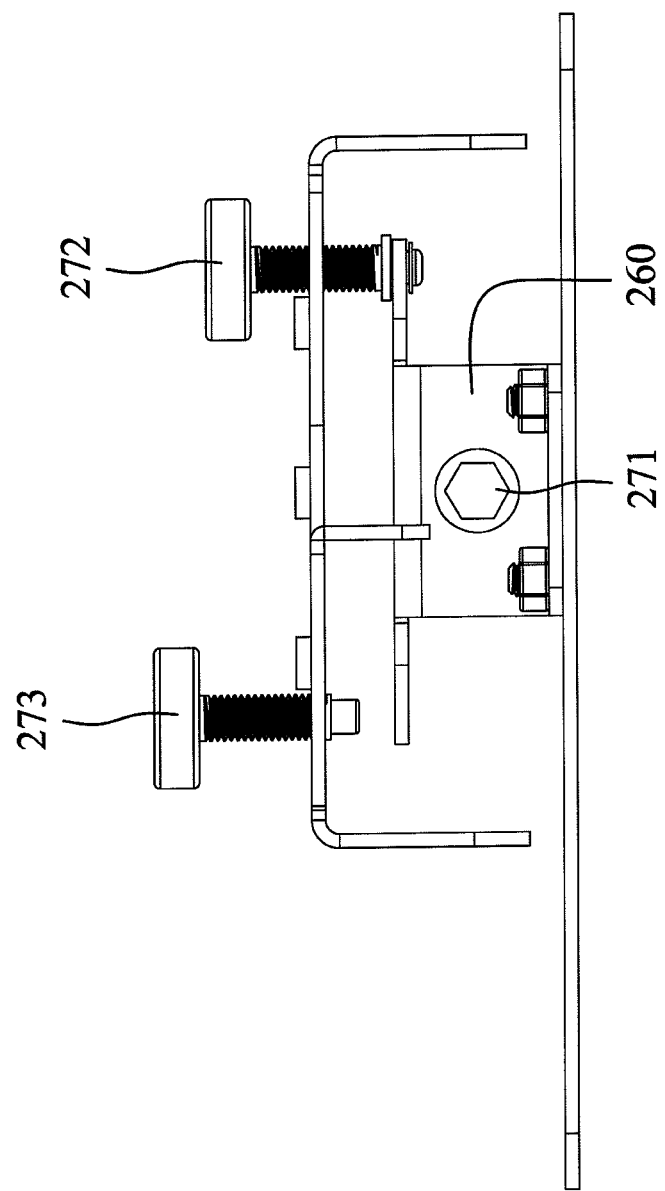
FIGS. 4A and 4B show the angle adjusting process of the Z axis pivoting unit of the embodiment of the invention.
Figure 4B:
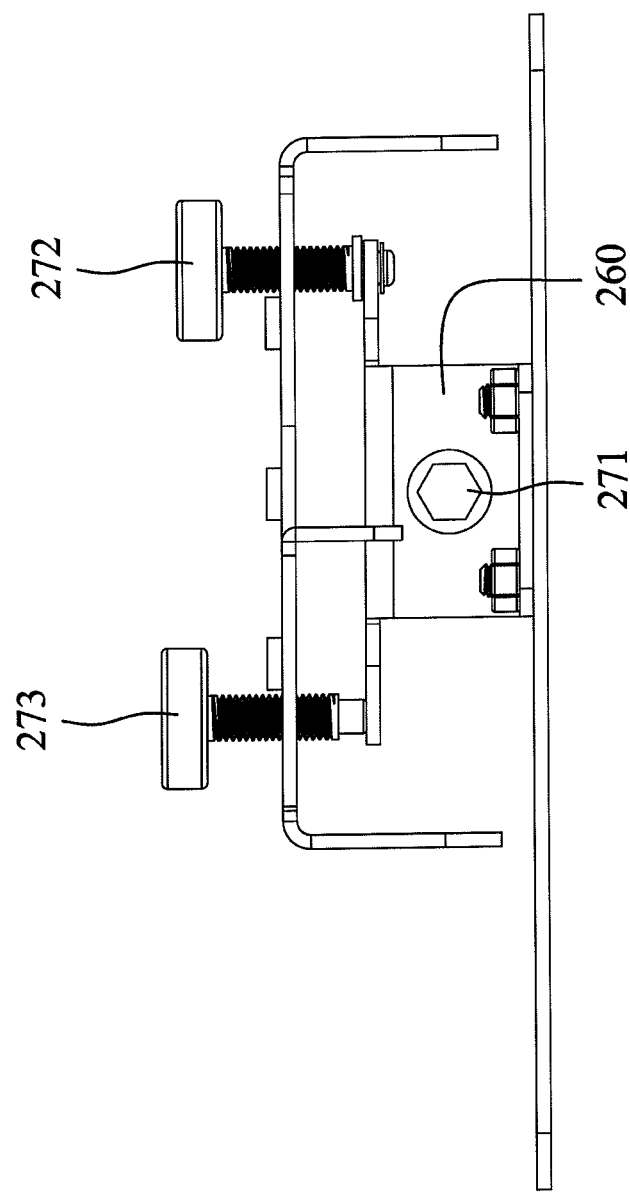

With reference to FIGS. 4A and 4B, the angle adjusting process of the embodiment is described with the angle adjusting process of the Z axis pivoting unit 270 for example. First, the Z axis pivoting fixing screw 273 is released. Then, the Z axis pivoting fine-tune screw 272 is rotated to modify the orientation of the third member 260. Finally, the Z axis pivoting fixing screw 273 is fastened to position the third member 260. The angle adjusting processes of the X axis pivoting unit and the Y axis pivoting unit are similar to that of the Z axis pivoting unit.

Utilizing the projector mount of the embodiment of the invention, the position of the projector can be fine-tuned under six degrees of freedom (three translational degrees of freedom and three rotational degrees of freedom). The position of the projector can be conveniently modified. Additionally, as to the translational movement, the foundation, the base and the telescopic element are connected by screws attached on side portions thereof, and the translation fine-tune screws are utilized to fine-tune the translation, and the structure of the projector mount is therefore stable in the translation fine-tune process. As to the rotational movement, the pivoting fine-tune screws are utilized to fine-tune the rotation, and the pivoting fixing screws are utilized to fasten the position of the first member, the second member, and the third member, and the structure of the projector mount is therefore stable in the rotational fine-tune process.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:
1. A projector mount, comprising:
a foundation;
a base, connected to the foundation;
a Y axis translation unit, connected to the foundation and the base, wherein the base is moved in a Y axis relative to the foundation via the Y axis translation unit;
a rod, connected to the base;
an X axis translation unit, connected to the rod and the base, wherein the rod is moved in an X axis relative to the base via the X axis translation unit;
a telescopic element, connected to the rod;

a Z axis translation unit, connected to the rod and the telescopic element, wherein the telescopic element is moved in a Z axis relative to the rod via the Z axis translation unit; and an angle adjusting unit, connected to the telescopic element, wherein the Y axis translation unit comprises a Y axis translation fine-tune screw, the Y axis translation fine-tune screw connects the base to the foundation, and the base is moved in the Y axis relative to the foundation by rotating the Y axis translation fine-tune screw, wherein the X axis translation unit comprises an X axis translation fine-tune screw, the X axis translation fine-tune screw connects the base to the rod, and the rod is moved in the X axis relative to the base by rotating the X axis translation fine-tune screw, wherein the Z axis translation unit comprises a Z axis translation fine-tune screw, the Z axis translation fine-tune screw connects the telescopic element to the rod, and the telescopic element is moved in the Z axis relative to the rod by rotating the Z axis translation fine-tune screw.

2. The projector mount as claimed in claim 1, wherein the Z axis translation unit further comprises a Z axis translation rough-tune screw, and when the Z axis translation rough-tune screw is detached, the telescopic element moves freely on the Z axis relative to the rod.

3. The projector mount as claimed in claim 1, wherein the X axis, Y axis and Z axis are perpendicular to each other.

4. An angle adjusting unit, comprising:
a stage;
a first member, connected to the stage;
a Y axis pivoting unit, connected to the stage and the first member, wherein the first member pivots around a Y axis relative to the stage via the Y axis pivoting unit;
a second member, connected to the first member;
an X axis pivoting unit, connected to the first member and the second member, wherein the second member pivots around an X axis relative to the first member via the X axis pivoting unit;
a third member, pivoted relative to the first member; and
a Z axis pivoting unit, wherein the third member pivots around a Z axis relative to the first member via the Z axis pivoting unit,
wherein the Z axis pivoting unit comprises a Z shaft, a Z axis pivoting fine-tune screw, and a Z axis pivoting fixing screw, wherein the Z shaft passes through the second member and the third member, the Z axis pivoting fine-tune screw passes through the third member and is connected to the first member and the third member, the third member is pivoted around the Z shaft relative to the first member by rotating the Z axis pivoting fine-tune screw, and the Z axis pivoting fixing screw abuts the third member to position the third member.

5. The angle adjusting unit as claimed in claim 4, wherein the Y axis pivoting unit comprises a Y shaft, a Y axis pivoting fine-tune screw, and a Y axis pivoting fixing screw, wherein the Y shaft passes through the first member and the stage, the Y axis pivoting fine-tune screw passes through the first member and is connected to the first member and the stage, the first member is pivoted around the Y shaft relative to the stage by rotating the Y axis pivoting fine-tune screw, and the Y axis pivoting fixing screw abuts the first member to position the first member.

6. The angle adjusting unit as claimed in claim 4, wherein the X axis pivoting unit comprises an X shaft, an X axis pivoting fine-tune screw, and an X axis pivoting fixing screw, wherein the X shaft passes through the first member and the second member, the X axis pivoting fine-tune screw passes through the second member and is connected to the first member and the second member, the second member is pivoted around the X shaft relative to the first member by rotating the X axis pivoting fine-tune screw, and the X axis pivoting fixing screw abuts the second member to position the second member.

7. The angle adjusting unit as claimed in claim 6, wherein an X axis pivoting fine-tune slot is formed on the stage, and the X axis pivoting fine-tune screw passes through the X axis pivoting fine-tune slot.

8. The angle adjusting unit as claimed in claim 7, wherein the X axis pivoting fine-tune slot is curved.

9. The angle adjusting unit as claimed in claim 4, wherein a Z axis pivoting fine-tune slot is formed on the stage, and the Z axis pivoting fine-tune screw passes through the Z axis pivoting fine-tune slot.

10. The angle adjusting unit as claimed in claim 9, wherein the Z axis pivoting fine-tune slot is curved.

11. The angle adjusting unit as claimed in claim 4, wherein the X axis, Y axis and Z axis are perpendicular to each other.

12. A projector mount, comprising:
a foundation;
a base, connected to the foundation;
a Y axis translation unit, connected to the foundation and the base, wherein the base is moved in a Y axis relative to the foundation via the Y axis translation unit;
a rod, connected to the base;
an X axis translation unit, connected to the rod and the base, wherein the rod is moved in an X axis relative to the base via the X axis translation unit;
a telescopic element, connected to the rod;
a Z axis translation unit, connected to the rod and the telescopic element, wherein the telescopic element is moved in a Z axis relative to the rod via the Z axis translation unit; and
an angle adjusting unit, connected to the telescopic element, wherein the angle adjusting unit comprises:
a stage;
a first member, connected to the stage;
a Y axis pivoting unit, connected to the stage and the first member, wherein the first member pivots around the Y axis relative to the stage via the Y axis pivoting unit;
a second member, connected to the first member;
an X axis pivoting unit, connected to the first member and the second member, wherein the second member pivots around the X axis relative to the first member via the X axis pivoting unit;
a third member, pivoted relative to the first member; and
a Z axis pivoting unit, wherein the third member pivots around the Z axis relative to the first member via the Z axis pivoting unit.

13. The projector mount as claimed in claim 12, wherein the Y axis translation unit comprises a Y axis translation fine-tune screw, the Y axis translation fine-tune screw connects the base to the foundation, and the base is moved in the Y axis relative to the foundation by rotating the Y axis translation fine-tune screw, wherein the X axis translation unit comprises an X axis translation fine-tune screw, the X axis translation fine-tune screw connects the base to the rod, and the rod is moved in the X axis relative to the base by rotating the X axis translation fine-tune screw, wherein the Z axis translation unit comprises a Z axis translation fine-tune screw, the Z axis translation fine-tune screw connects the telescopic element to the rod, and the telescopic element is moved in the Z axis relative to the rod by rotating the Z axis translation fine-tune screw.

14. The projector mount as claimed in claim 12, wherein the Y axis pivoting unit comprises a Y shaft, a Y axis pivoting fine-tune screw, and a Y axis pivoting fixing screw, wherein the Y shaft passes through the first member and the stage, the Y axis pivoting fine-tune screw passes through the first member and is connected to the first member and the stage, the first member is pivoted around the Y shaft relative to the stage by rotating the Y axis pivoting fine-tune screw, and the Y axis pivoting fixing screw abuts the first member to position the first member, wherein the X axis pivoting unit comprises an X shaft, an X axis pivoting fine-tune screw and an X axis pivoting fixing screw, wherein the X shaft passes through the first member and the second member, the X axis pivoting fine-tune screw passes through the second member and is connected to the first member and the second member, the second member is pivoted around the X shaft relative to the first member by rotating the X axis pivoting fine-tune screw, and the X axis pivoting fixing screw abuts the second member to position the second member, wherein the Z axis pivoting unit comprises a Z shaft, a Z axis pivoting fine-tune screw, and a Z axis pivoting fixing screw, wherein the Z shaft passes through the second member and the third member, the Z axis pivoting fine-tune screw passes through the third member and is connected to the first member and the third member, the third member is pivoted around the Z shaft relative to the first member by rotating the Z axis pivoting fine-tune screw, and the Z axis pivoting fixing screw abuts the third member to position the third member.

15. The projector mount as claimed in claim 14, wherein an X axis pivoting fine-tune slot is formed on the stage, and the X axis pivoting fine-tune screw passes through the X axis pivoting fine-tune slot, wherein the X axis pivoting fine-tune slot is curved.

16. The projector mount as claimed in claim 14, wherein a Z axis pivoting fine-tune slot is formed on the stage, and the Z axis pivoting fine-tune screw passes through the Z axis pivoting fine-tune slot, wherein the Z axis pivoting fine-tune slot is curved.

* * * * *